Dec. 25, 1928.

G. FORNACA

SPRING CONTROLLED GEAR

Filed Nov. 26, 1927

1,696,797

Inventor:
Guido Fornaca
By
Attorney

Patented Dec. 25, 1928.

1,696,797

UNITED STATES PATENT OFFICE.

GUIDO FORNACA, OF TURIN, ITALY.

SPRING-CONTROLLED GEAR.

Application filed November 26, 1927, Serial No. 235,953, and in Italy August 25, 1927.

The present invention relates to spring means for controlling movable parts, and more particularly for controlling valves, especially in internal combustion engines.

The invention has for its object the provision of spring means for exerting a resilient pressure on a member, particularly on a valve for combustion engines and the like, in which the valve-controlling coil spring or springs is or are divided into two or more sections which operate in series, said sections being arranged concentric with and on the extension of each other and each set of spring sections being located between an abutment and a part solid with the movable member or valve.

In accordance with the present invention, since the period of vibration of a coil spring increases as the number of turns and the weight of the spring are reduced, it is possible to impart to each spring section a period of vibration which is not in resonance with the number of impulses the spring controlled member or valve receives from its cam or other actuating member.

By the present invention the essential cause of breakage of springs is removed, said cause, as known, being the increase in stresses acting on the metal of the spring in consequence of the resonance of inherent vibration of the spring with the number of impulses imparted either to the spring or to the parts connected therewith, or to both by the actuating member or cam.

Figure 1:
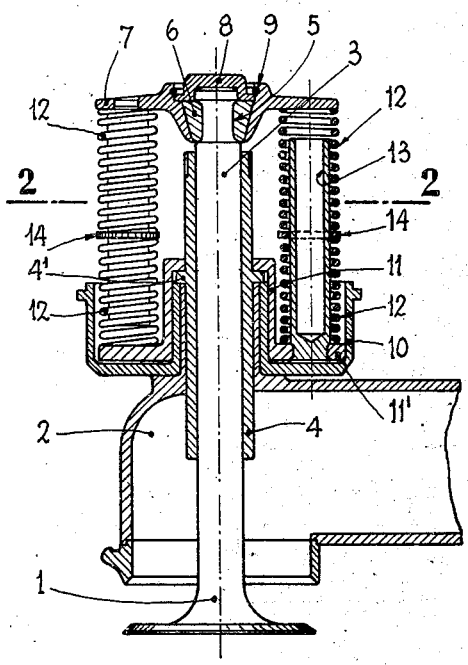
Figure 2:
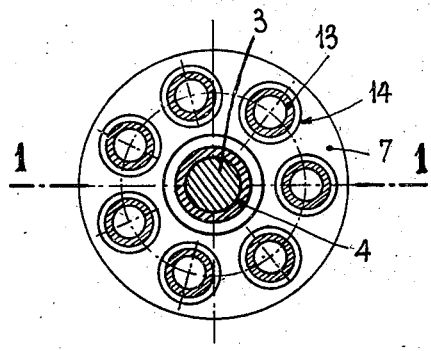

The annexed drawing illustrates by way of example an embodiment of this invention and Figure 1 is a section of a valve equipped with springs in accordance with the invention, said section being taken on line 1—1 of Figure 2;

Figure 2 is a section on line 2—2 of Fig. 1.

In the drawing, a valve 1 is shown which controls a duct 2 which is assumed to connect, say, a carbureter or an exhaust with a cylinder (not shown) into which said duct 2 opens.

Said valve 1 has a stem 3 guided in a sleeve 4 fastened in duct 2 and the free end of said stem 3 has a groove 5 in which are engaged ring sections 6 having tapering outer surfaces. A disk 7 having a tapering bore is located on said ring sections 6 and the parts are assembled by means of a cap 8 located on the end of stem 3 and engaged with disk 7 by means of a resilient split ring 9 which engages the edge of said cap 8 and a concentric groove in the bore of said disk 7.

A member, not shown, such as a cam or a cam controlled part, acts on the end cap 8 of the valve stem to move said valve away from its seat and to carry it into the position shown in Fig. 1 against the action of return springs 12 as hereinafter described.

A protecting cup 10 is located around the guide sleeve 4 in duct 2 and a flanged sleeve 11 engages the shoulder $4^1$ of sleeve 4 and has a bottom radial flange $11^1$ on which the adjacent ends of springs 12 are seated.

Coil springs 12 are located in a row around the valve stem 3 and guide sleeve 4 and said springs are arranged between flange $11^1$ and disk 7 and act to move the valve 1 into its closed position from its open position shown in the drawing. Spring guiding stems 13 are fastened alternately on disk 7 and flange $11^1$, said stems 13 extending each through the central hollow space of a coil spring 12 to provide a guide therefor.

The above construction is described and illustrated as an example of a construction adapted for the embodiment of the present invention, said construction being not claimed per se in the present application as it is described and claimed in my U. S. Patent No. 1,605,399 dated Nov. 2, 1926, but of course the features of the present invention as hereinafter described are not restricted to the described construction, they being capable of extensive use in connection with spring gears.

In accordance with the present invention each spring comprises a number of sections 12—12 which are concentric and aligned with each other, a washer or ring 14 being inserted between the sections 12—12 of each spring.

In the drawing the springs are shown as consisting each of two sections but of course they may comprise each a larger number of sections at will, a ring or washer 14 being inserted between adjacent sections.

Each set of concentric and aligned spring sections acts on the valve disk 7 as a single spring, but in said sets each spring section has such a number of turns and consequently such a rigidity and weight as to impart to it an inherent vibration period which is out of resonance with respect to the period of actuating impulses exerted on the valve and associated springs by the member operating said valve, which member, as previously stated, is not shown.

By dividing the springs into a more or less great number of sections according to the speed of the engine, it is possible to avoid critical periods within the limits of use of the engine.

What I claim as my invention and desire to secure by United States Letters Patent is:

1. In a spring operated gear, a return spring comprising a number of sections, said sections being included serially between a stationary part and a movable part of said gear.

2. In a valve gear, a valve return spring comprising a number of sections, said sections being included serially between a stationary part and a movable part of said gear.

3. In a valve gear, a valve return spring comprising a number of sections which are included serially between a stationary part and a movable part of said gear, and a rigid separating member interposed between the adjacent ends of said sections.

4. In a valve gear, a valve return spring comprising two sections included serially between a stationary part and a movable part of said gear.

5. In a valve gear, a number of valve return springs each comprising a number of sections included serially between a stationary part and a movable part of said gear.

6. In a valve gear, a number of valve return springs arranged in a circular row around the stem of the valve, each of said springs comprising a number of sections included serially between a stationary part and a movable part of said gear.

7. In a valve gear, a number of valve return springs arranged in a circular row around the stem of the valve, each of said springs comprising a number of sections included serially between a stationary part and a movable part of said gear, and a rigid separating member interposed between the adjacent ends of the sections of each spring.

8. In a valve gear, a number of valve return springs arranged around the stem of the valve, each of said springs comprising a number of sections included serially between a stationary part and a movable part of said gear, guide members each solid with one of said parts and extending through one of said springs, and rigid rings each inserted between the adjacent ends of the sections of each spring and free on one of said guide members.

9. In a valve gear comprising an operating member whcih produces a periodical impulse on said gear, a valve return spring comprising a number of sections included serially between a stationary part and a movable part of said gear, each of said spring sections having an inherent vibratory period different with respect to the period of said operating impulses.

In testimony whereof I affix my signature.

GUIDO FORNACA.